(12) United States Patent
Nishio et al.

(10) Patent No.: US 7,280,240 B2
(45) Date of Patent: Oct. 9, 2007

(54) IMAGE PROCESSING APPARATUS AND CUSTOMIZED PRINTING SYSTEM USING THE SAME

(75) Inventors: Tomonori Nishio, Kanagawa (JP); Yukari Sakuramoto, Kanagawa (JP); Yuji Oshikoshi, Tokyo (JP)

(73) Assignee: Fujifilm Corporation, Tokyo (JP)

(*) Notice: Subject to any disclaimer, the term of this patent is extended or adjusted under 35 U.S.C. 154(b) by 1081 days.

(21) Appl. No.: 09/897,110

(22) Filed: Jul. 3, 2001

(65) Prior Publication Data

US 2002/0054325 A1 May 9, 2002

(30) Foreign Application Priority Data

Jul. 4, 2000 (JP) ............................. 2000-202208

(51) Int. Cl.
*G06F 3/12* (2006.01)
*G06F 15/00* (2006.01)
*G06K 1/00* (2006.01)

(52) U.S. Cl. .................. 358/1.15; 358/1.1; 358/1.9; 358/1.13; 358/1.15; 358/1.18; 715/525; 715/527

(58) Field of Classification Search .............. 358/1.15, 358/1.9, 1.18, 1.1, 1.13; 715/525, 527
See application file for complete search history.

(56) References Cited

U.S. PATENT DOCUMENTS 6,072,916 A * 6/2000 Suzuki ........................ 382/303
6,559,967 B1 * 5/2003 Akiba et al. ................. 358/1.16
6,785,814 B1 * 8/2004 Usami et al. ................. 713/176

FOREIGN PATENT DOCUMENTS

JP 11331570 11/1999

* cited by examiner

Primary Examiner—Twyler Lamb
Assistant Examiner—Yixing Qin
(74) Attorney, Agent, or Firm—Birch, Stewart, Kolasch & Birch, LLP

(57) ABSTRACT

The image processing apparatus includes an image processing section for executing at least one image processing operation with respect to digital image data and a set value chancing device for selecting a plurality of image processing conditions as to said at least one image processing operation from among plural levels or plural combinations which are typically preset of image processing conditions, and changing set values of the plurality of image processing conditions from previously set values into the selected plurality of image processing conditions. The customized printing system includes the image processing apparatus, an image input apparatus and an image output apparatus. The image processing apparatus is capable of executing the image processing operation or operations in response to a printing order customized by a customer, and the system is capable of forming a print which may reflect the requests from the customer.

16 Claims, 7 Drawing Sheets

FIG. 3

PERSONAL INFORMATION REGISTRATION SLIP

OPERATION [ ]   1. NEWLY REGISTER
2. CHANGE
3. DELETE

TEL [ ]

NAME [ ]

AGE [ ]   MALE FEMALE [ ]

CONFIRM [ ]   1. OK (RETURN)
2. OK (NEXT)
3. CORRECT

FIG. 4

FINISHING CONTENT REGISTRATION LIST FOR SIMULTANEOUS PRINTING (SET REGISTRATION)

OPERATION [ ]   1. NEWLY REGISTER
2. CHANGE
3. DELETE

| SET No. | SET NAME | FINISHING CONTENT (DIGITS) |
|---|---|---|
| 1 | STANDARD FINISHING | 000 ··· 0 |
| 2 | RV-TONE FINISHING | 112 ··· 0 |
| 3 | SCENE-IMAGE FINISHING | 222 ··· 0 |
| 4 | HUMAN-IMAGE FINISHING | 322 ··· 0 |
| ⋮ | ⋮ | |
| 9 | INDIVIDUAL FINISHING | |

FIG. 5

INDIVIDUAL DATA REGISTRATION LIST

| ITEM No. | ITEM | FINISHING CONTENT (10 DIGITS) | | | | |
|---|---|---|---|---|---|---|
| 0 | SHARPNESS | 1. WEAK | 2. LITTLE WEAK | 3. MODERATE | 4. LITTLE STRONG | 5. STRONG |
| 1 | GRADATION | 1. SOFT | 2. LITTLE SOFT | 3. MODERATE | 4. LITTLE HARD | 5. HARD |
| 2 | DENSITY | 1. THIN | 2. LITTLE THIN | 3. MODERATE | 4. LITTLE DENSE | 5. DENSE |
| 3 | COLOR (SATURATION) | 1. LOW | 2. LITTLE LOW | 3. MODERATE | 4. LITTLE HIGH | 5. HIGH |
| 4 | EDGE | 1. NON | 2. CONTAINED | | | |
| 5 | LOGO GRAM | 1. NON | 2. TDL | 3. KITTY | 4. FUJI | |
| ... | | | | | | |
| 9 | | | | | | |

FIG. 6
[PRINT ORDERING ENVELOPE]
① NAME [       ]   TEL№. [   ]
② BASIC ORDER CONTENT
   a. TYPE OF NEGATIVE FILM    135/120/ △PS  12/24/36 EX
   b. PRINT SIZE    E/L/KING/2L
③ CUSTOMIZED ORDER FOR SIMULTANEOUS PRINTING    Y / N
CLIENT ID         
FINISHING CONTENT  XXXX···X
3456
70
74
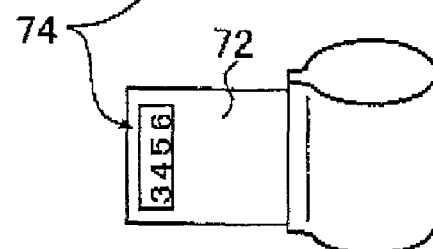
72

IMAGE PROCESSING APPARATUS AND CUSTOMIZED PRINTING SYSTEM USING THE SAME

BACKGROUND OF THE INVENTION

1. Field of the Invention

The present invention relates to an image processing apparatus and a customized printing system with employment of such an image processing apparatus, capable of performing image processing operations in response to printing orders from customers so as to form prints desired by these customers.

2. Description of the Related Art

Most of the images recorded on photographic films such as negative films and reversal films (which are hereinafter referred to as "films") are conventionally printed onto light-sensitive materials (photographic paper) by a technique generally called "direct exposure" (analog exposure) in which an image on a film is projected onto the light-sensitive material for areal exposure.

A printer that adopts digital exposure has recently been commercialized. In this "digital photoprinter", an image recorded on a film is read photoelectronically and converted into digital signals, which axe subjected to various kinds of image processing to produce recording image data; a light-sensitive material is exposed by scanning with recording light modulated in accordance with the image data, thereby recording a (latent) image to produce a (finished) print therefrom.

The digital photoprinter can convert an image into digital image data and determine exposure conditions at the time of printing the image by image data processing. Hence, the digital photoprinter is capable of performing effective image processing operations such as the correction of washed-out highlights or flat shadows due to the taking of pictures with back light or an electronic flash, sharpening and the correction of color or density failure and this enables the production of high-quality prints that have been impossible to attain by the conventional direct exposure technique. Moreover, since composition and division of a plurality of images, composition of characters or the like can be performed by the image data processing, a print that is freely edited and/or processed depending on an application can be outputted.

It is preferable that an image is not only outputted as a print from the digital photoprinter mentioned above but also the image reproduced on the print is suitably adapted to a customer (person who requests printing). To this end, the applicant of the present invention has already proposed in Japanese Patent Application Laid-open No. Hei-11-331570 an image processing method and an image processing apparatus in which finishing suitably adapted to customers is carried out by image processing to thereby output prints having higher commercial values.

This document discloses that the image processing operations to be performed and the image processing conditions are set in accordance with the acquired customer information such as occupations, sexes or ages of customers.

To be more specific, in a case in which a film is a reversal film and the customer information acquired for the occupation is a professional photographer, image processing conditions are set so as to reproduce an image photographed on the film faithfully. In a case in which the customer information is acquired that the customer is a person who works in construction fields, look-up tables (LUTs) are set to apply dodging strongly so that an image having no washed-out highlights or flat shadows can be obtained. Further, in a case of a male, the image processing conditions are set so that a face region is extracted and sharpness of this region is given rather strongly to make gradation prominent and show details. In a case of a female, the image processing conditions are set as follows: A face region is extracted and sharpness is given rather weakly or soft focusing is applied extremely weakly to make gradation less prominent and to make live spots, wrinkles, freckles or the like less outstanding.

Japanese Patent Application Laid-open No. Hei 11-331570 as mentioned above discloses that the apparatus automatically sets the image processing conditions from the customer information such as occupations, sexes and ages of customers to perform finishing processes considered to be suitably adapted to the customers. As mentioned above however, the image processing conditions do not depend on the customized orders given from the customers, but are set by the apparatus based on the appearance (formal) information of the customers. As a result, there was such a problem that requests from the customers could not be always correctly reflected on the thus set image processing conditions.

SUMMARY OF THE INVENTION

The present invention has been made to solve the above-mentioned problem, and therefore, has an object to provide an image processing apparatus and a customized printing system with employment of such an image processing apparatus, capable of executing an image processing operation or operations in response to a printing order customized by a customer, and capable of forming a print which may reflect the requests from the customer.

In order to attain the object described above, the first aspect of the present invention provided an image processing apparatus comprising: an image processing unit for executing at least one image processing operation with respect to digital image data, and a set value changing device for selecting a plurality of image processing conditions as to the at least one image processing operation from among plural levels or plural combinations which are typically preset of image processing conditions, and changing set values of the plurality of image processing conditions from previously set values into the selected plurality of image processing conditions.

Preferably, the at least one image processing operation includes any one of a sharpness processing operation, a gradation processing operation, a density processing operation, a color processing operation, a shielding-print processing operation, a partial correction processing operation, a logogram/character-synthesizing process operation, and an edging process operation; and the image processing conditions includes conditions as to at least one set of execution/no execution, strong/weak, and deep/light of one image processing operation.

It is preferable that the image processing apparatus further comprises: an embedding device for embedding the changed set values of the plurality of image processing conditions into output image data which has been processed based on the changed set values of the plurality of image processing conditions.

It is also preferable that the image processing apparatus further comprises: an image processing condition coding device for encoding the plurality of image processing conditions in batch mode; and wherein the image processing unit performs the at least one image processing operation based on coded information which the plurality of image processing conditions is coded in the batch mode.

In order to attain the object described above, the second aspect of the present invention provides a customized printing system comprising: an image input apparatus for inputting thereinto an image as digital image data; an image processing apparatus comprising: an image processing unit for executing at least one image processing operation with respect to digital image data, and a set value changing device for selecting a plurality of image processing conditions as to the at least one image processing operation from among plural levels or plural combinations which are typically preset of image processing conditions, and changing set values of the plurality of image processing conditions from previously set values into the selected plurality of image processing conditions; and an image output apparatus for outputting the image-processed image data as output image data.

Preferably, the at least one image processing operation includes any one of a sharpness processing operation, a gradation processing operation, a density processing operation, a color processing operation, a shielding-print processing operation, a partial correction processing operation, a logogram/character-synthesizing process operation, and an edging process operation; and the image processing conditions include conditions as to at least one set of execution/no execution, strong/weak, and deep/light of one image processing operation.

Preferably, the image processing apparatus is further comprises: an embedding device for embedding the changed set values of the plurality of image processing conditions into the output image data which has been processed based on the changed set values of the plurality of image processing conditions.

Preferably, the image processing apparatus further comprises: an image processing condition coding device for encoding the plurality of image processing conditions in batch mode; and the image processing apparatus performs the at least one image processing operation based on coded information which the plurality of image processing conditions is coded in the batch mode.

It is preferable that the customized printing system further comprises: a database which registers thereinto both a film identification number and image processing conditions with respect to an image photographed on a photographic film corresponding to the film identification number.

Preferably, the database is to further register information related to a customer in connection with the image processing conditions as to a printing order of the customer.

Preferably, the database is connected to a plurality of other databases via a communication network, whereby the image processing conditions related to the customer, which is saved in the other databases, can be utilized based on the information related to the customer.

BRIEF DESCRIPTION OF THE DRAWINGS

A more better understanding of the present invention may be made by reading a detailed description in conjunction with the accompanying drawings, in which:

FIG. 3 is an explanatory diagram for explaining an example of a display screen obtained when personal information is registered in the customized printing system of this embodiment;

FIG. 4 is an explanatory diagram for explaining registered contents obtained when simultaneous printing operation is set;

FIG. 5 is an explanatory diagram for explaining registered contents obtained when individual printing contents are registered;

FIG. 6 is an explanatory diagram for illustratively showing an example of a print ordering envelope;

DETAILED DESCRIPTION OF THE PREFERRED EMBODIMENTS

Referring now to the accompanying drawings, an image processing apparatus and a customized printing system using this image processing apparatus, according to a preferred embodiment of the present invention, will be described in detail.

Figure 1:
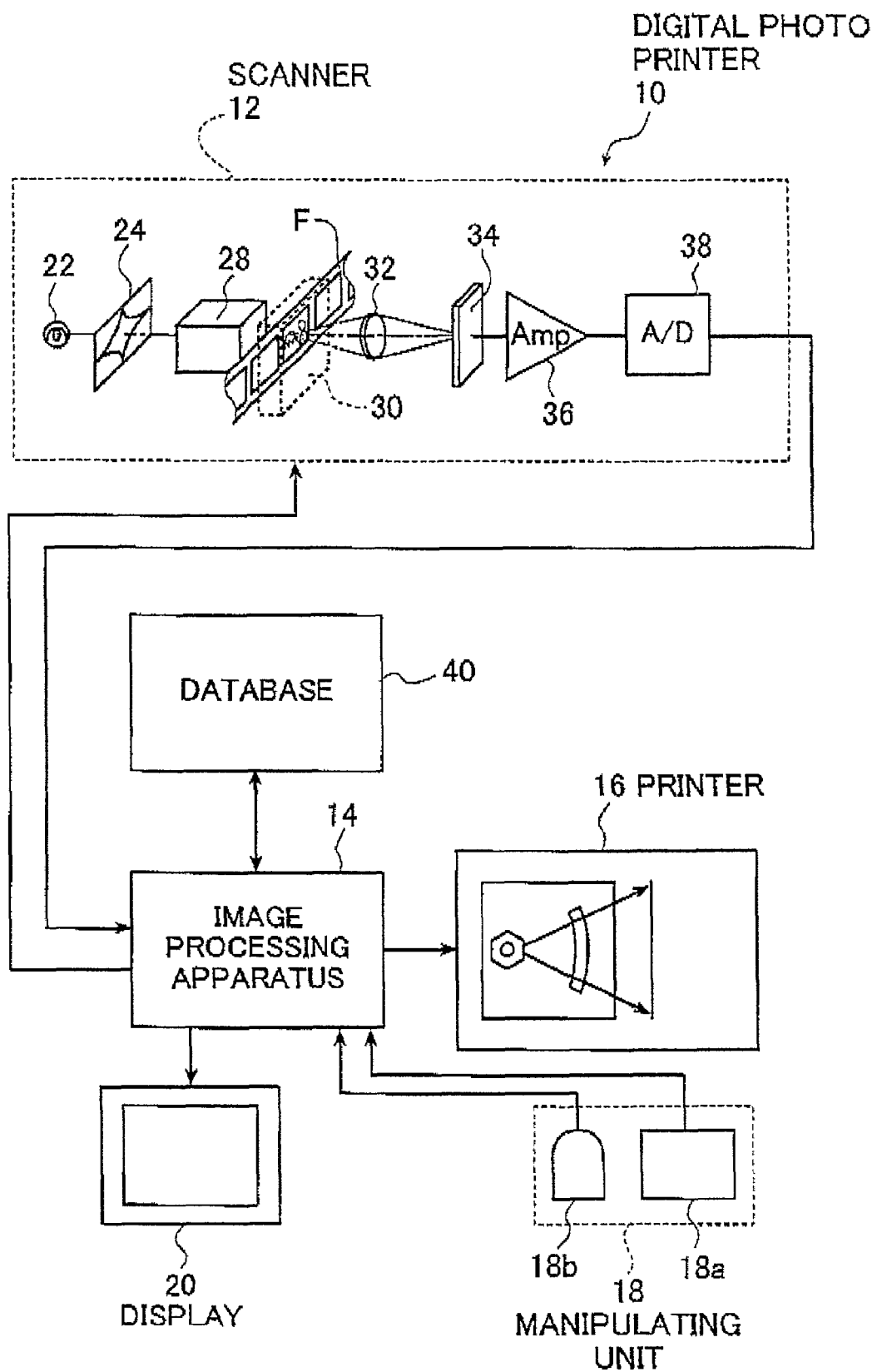
FIG. 1 is a schematic block diagram for indicating an example of a digital photoprinter employed in a customized printing system according to an embodiment of the present invention.

FIG. 1 is a block diagram for schematically indicating an arrangement of a digital photoprinter used in the customized printing system of the present invention.

The digital photoprinter (hereinafter referred to as "photoprinter") which is generally indicated by 10 in FIG. 1 includes a scanner 12 for photoelectric reading of the image recorded on a film F, an image processing apparatus 14 which performs image processing on the thus read image data and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, a display 20 for representing the image read with the scanner 12, various manipulative commands and pictures for setting and registering various conditions, and a database 40 in which film identification numbers, customer information and other information such as image processing conditions are registered.

The scanner 12 is a device with which the images recorded on a film F or the like are read photoelectrically frame by frame, and includes a light source 22, a variable diaphragm 24, a diffuser box 28 with which the reading light incident on the film F is made uniform on the plane thereof, an imaging lens unit 32, an image sensor 34 having line CCD sensors corresponding to the reading of respective R (red), G (green), and B (blue) images, an amplifier 36 and an A/D (analog-to-digital) converter 38.

In the illustrated photoprinter 10, dedicated carriers are available that the file F can be loaded into the housing of the scanner 12 in accordance with the type or size of the film used (e.g. whether it is of an Advanced Photo System or a negative or a reversal of 135 size) or the format of the film (e.g. whether it is a strip or a slide). By replacing one carrier with another, the photoprinter 10 can be adapted to process various kinds of films in various modes. The image (frame) that is recorded on the film and which is subjected to the necessary procedure for print production is transported to a specified reading position by means of the carriers.

In the scanner 12 described above, when the images recorded on the film F are read, the reading light emitted from the light source 22 with its quality of light adjusted by the variable diaphragm 24 is incident on the film F located at the predetermined reading position by the carrier 30 and passes therethrough, whereby projected light carrying the images recorded on the film F can be obtained.

The carrier 30 transports the film F with the lengthwise direction of the film F being in coincidence with an auxiliary scanning direction perpendicular to the direction in which the line CCD sensors of the image sensor 34 extend (main scanning direction) while locating the film F at the predetermined reading position. The images recorded on the respective frames of the film F are read in such a manner that the film F is transported in the auxiliary scanning direction by the carrier 30 while being located at the reading position and two-dimensionally slit scanned with the reading light incident thereon.

Further, as known well, a magnetic recording medium is formed on the film of the Advanced Photo System, and various types of information such as a type of a film, a photographing date, presence or absence of light emitted from an electronic flash, a title, and the like are recorded on the magnetic recording medium. A carrier corresponding to the Advanced Photo System is provided with a magnetic head for recording necessary information on the magnetic reading medium and for reading out information recorded thereon. Various types of information read out by the magnetic head are sent to predetermined sections such as the image processing apparatus 14, and the like, when necessary.

As described above, the reading light passes through the film F held by the carrier 30 and becomes projected light carrying the images, and then the projected light is imaged on the light receiving surface of the image sensor 34 by the imaging lens unit 32.

The image sensor 34 is a so-called three-line color CCD sensor having three line CCD sensors for reading an R image, a G image and a B image, respectively, and each line sensor extends in the main scanning direction as described above. The projected light from the film F is separated into the three R, G, and B primary colors by the image sensor 34 and photoelectrically read.

The signals outputted from the image sensor 34 are amplified by the amplifier 36, converted to digital form in the A/D converter 38 and sent to the image processing apparatus 14.

In the scanner 12, the images recorded on the film F are captured by two scans, the first being prescan for reading the images at a low resolution and the second to be executed thereafter being fine scan for obtaining output image data.

The prescan is carried out under preset prescan reading conditions which ensure that all the images of the film F to be handled by the scanner 12 can be read without saturating the image sensor 34.

The reading conditions for each frame in the fine scan are set such that the image sensor 34 is saturated at a density which is somewhat lower than the minimum density of each image (frame) using the image data (prescanned data) obtained by the prescan.

Therefore, the output signal of the prescan is different from that of the fine scan in the pixel density and signal intensity.

It should be noted that when images are read with the scanner acting as an image data supply source, the scanning is by no means limited to a type that relies upon the slit scan exposure described above but that areal exposure may be employed by which the image on the entire surface of one frame is read at a time. In this case, an area CCD sensor, for example, is employed, a device for inserting R, G, and B color filters is interposed between the light source and the film F, and an image recorded on the film F is read with the area CCD sensor by sequentially inserting the R, G, and B color filters so that the image is read after it is separated into the three primary colors.

In addition to the scanner for reading a film as described above, exemplary preferable image data supply sources include an image reading apparatus for reading the image of a reflection original, an image recording device such as a digital camera, a digital video camera, etc., a communication network such as a LAN (local area network), a computer communication network or the like, a medium (recording medium) such as a memory card, an MO (magneto-optical recording medium), etc.

As described above, the digital signals outputted from the scanner 12 are supplied to the image processing apparatus 14 (hereinafter, abbreviated as processing apparatus 14).

Figure 2:
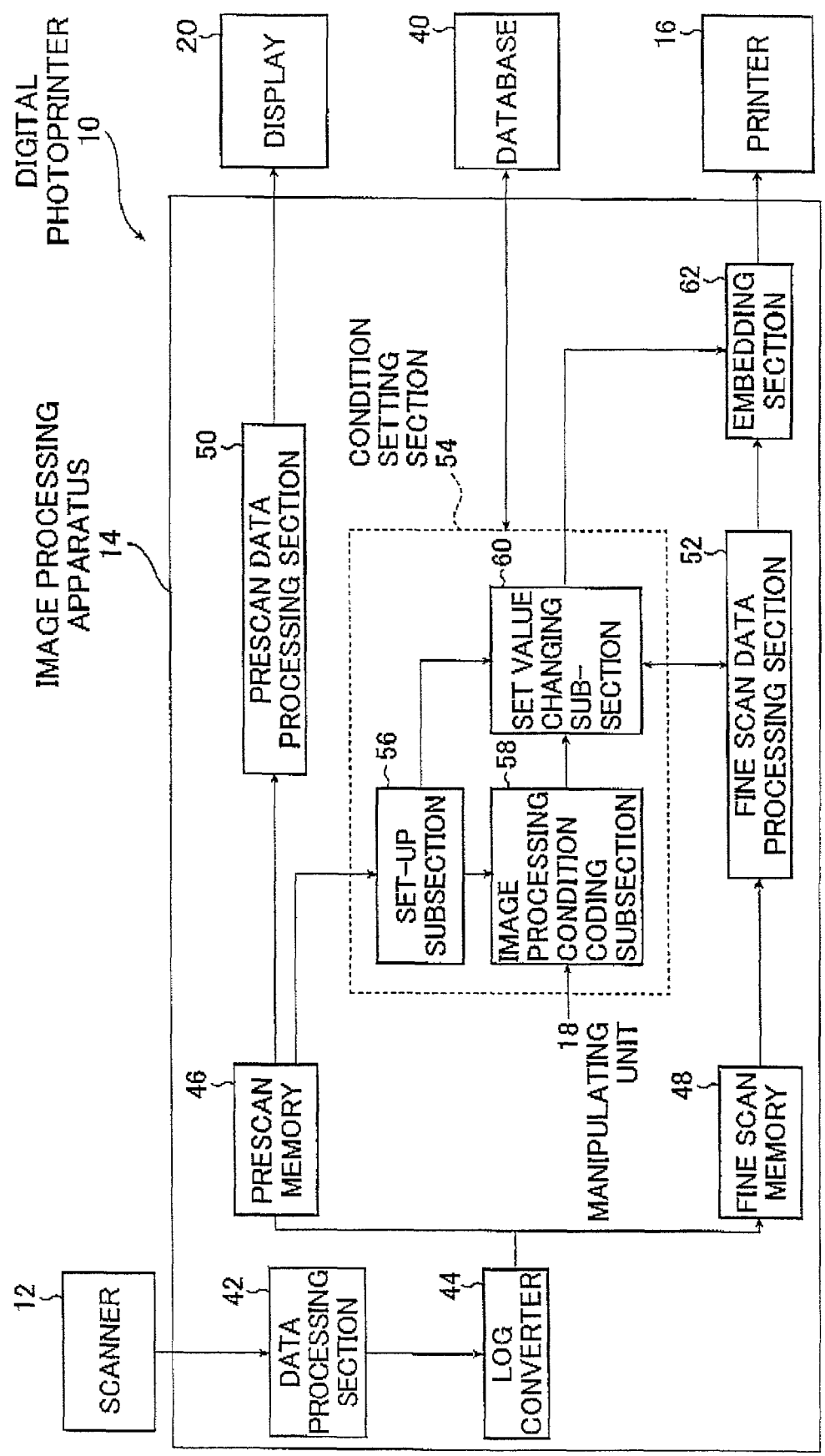
FIG. 2 is a schematic block diagram for indicating an arrangement of an image processing apparatus shown in FIG. 1.

FIG. 2 shows a block diagram of the processing apparatus 14. The processing apparatus 14 comprises a data processing section 42, a Log converter 44, a prescan (frame) memory 46, a fine scan (frame) memory 48, a prescan data processing section 50, a fine scan data processing section 52, and a condition setting section 54.

The condition setting section 54 includes a set-up subsection 56 for mainly setting the image processing conditions from the prescan data, an image processing condition coding subsection 58 for encoding the image processing conditions in batch mode in response to customized requests from customers, and a set value changing subsection 60 for changing values set for the image processing conditions. The processing apparatus 14 also includes an embedding section 62 for embedding the image processing conditions having been changed and finally set into output image data.

Note that FIG. 2 mainly shows only the sections which are related to the image processing. However, the processing apparatus 14 is provided with a CPU for controlling and managing the photoprinter 10 including the processing apparatus 14 in its entirety, a memory for storing information necessary to the operation and the like of the photoprinter 10, and the like, in addition to the above sections. Further, the manipulating unit 18 and the display 20 are connected to respective sections through the CPU and the like (CPU bus).

The respective R, G, and B digital signals outputted from the scanner 12 are subjected in the data processing section 42 to predetermined data processing such as darkness correction, defective pixel correction, shading correction, and the like. The processed digital signals are converted in the Log converter 44 into digital image data (density data) of which prescan data is stored in the prescan memory 46 and image data obtained by the fine scan (fine scan data) is stored in the fine scan memory 48. Note that the prescan data and the fine scan data are basically the same data except for the pixel density.

The prescan data stored in the prescan memory 46 is subsequently processed in the prescan data processing section 50 to provide image data for representing on the display 20 and the fine scan data stored in the fine scan memory 48 is subsequently processed in the fine scan data processing section 52 to provide image data for recording with the printer 16. The image processing conditions in the prescan data processing section 50 and the fine scan data processing section 52 are set in the condition setting section 54.

The condition setting section 54 sets reading condition for the fine scan and various processing conditions in the prescan data processing section 50 and the fine scan data processing section 52 As previously mentioned, the condition setting section 54 comprises the set-up subsection 56, the image processing condition coding subsection 53 and the set value changing subsection 60.

The set-up subsection 56 uses mainly the prescan data to set the reading conditions for the fine scan, the image processing operations to be performed in the prescan data processing section 50 and the fine scan data processing section 52, and the image processing conditions therefor. To be more specific, the set-up subsection 56 reads out the prescan data from the prescan memory 46 and, based upon the read prescan data, forms a density histogram and calculates image feature amounts including average density and specified frequency % point values in density histograms such as highlight (minimum density) and shadow (maximum density). Next, as mentioned above, the set-up subsection 56 sets the reading conditions for the fine scan including the stop-down value of the variable diaphragm 24 and the storage time of the image sensor 34 (line CCD sensor) in such a manner that the output from the image sensor 34 is saturated at a slightly lower density than the minimum density of the image of interest.

In addition to forming the density histogram and calculating the image feature amounts, the set-up subsection 56 sets the image processing operations to be performed in the prescan data processing section 50 and the fine scan data processing section 52 and the image processing conditions therefor as mentioned above in accordance with an instruction optionally given by an operator.

The image processing condition coding subsection 58 encodes the image processing conditions in batch mode based upon customized requests given by customers.

To be more specific, first, an operator enters customer information by manipulating the keyboard 18a and the like based on personal information registration slip received from a customer who comes to a DPE laboratory to give an order for printing. This personal information registration slip includes a name, a telephone number, an age, a sex, and the like. Thus, the operator registers the personal information of the customer while confirming the contents on the display screen of the display 20 as shown in FIG. 3.

As to a customer who came to this DPE laboratory for the first timer the operator registers personal information in a new registration mode. When such personal information has already been registered and the content thereof is to be changed, the operator enters in the registration change mode for the item to be changed. Then, when the operator enters "confirmation-OK" (either "RETURN" or "NEXT"), the customer information is registered via the image processing condition coding subsection 58 into the customer data file of the database 40. The registration of such customer information may be carried out only once when a customer gives an order at this DPE laboratory for the first time. Thereafter, the operator only needs to change the content when necessary.

When the operator inputs the name, the telephone number, the age, and the sex of the customer and enters the confirmation-OK (RETURN), the personal information is registered into the database 40 based upon the content represented on the display 20. Then, another screen for registering personal information on a next customer is represented on the display 20. When the operator enters the confirmation-OK (NEXT), the personal information is registered into the database 40 based on the content represented on the display 20, and then, such a screen as shown in FIG. 4 on which print finishing contents for the presently-registered customer can be registered is displayed.

To register the print finishing contents, the operator hears the customer's request for the print finishing contents when the customer gives an order at the DPE laboratory and then enters the contents by manipulating the keyboard 18a and the like.

The print finishing contents include 10 items such as sharpness, gradation, density, color (saturation), edge and logogram, as shown in FIG. 5. For the respective items, selection can be made for the strength, degree of density and necessity or non-necessity of a specific processing operation. When the operator inputs the requests of the customer by manipulating the keyboard 18a and the like, the image processing condition coding subsection 58 encodes the image processing conditions in batch mode and register the thus encoded conditions into the database 40.

Figure 7A:
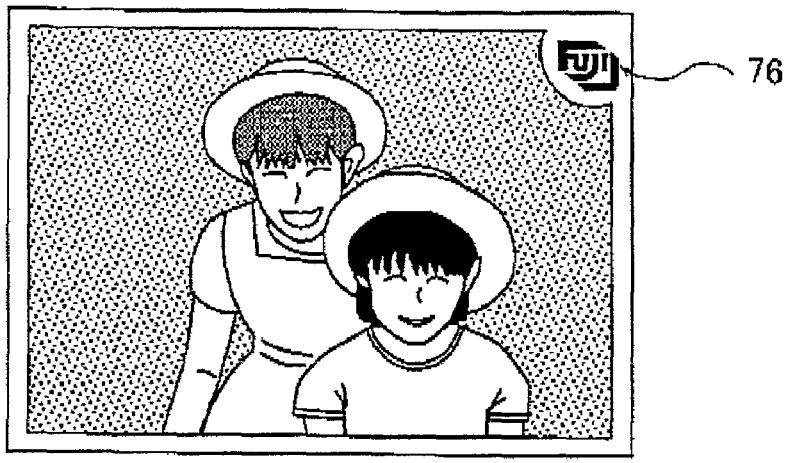
FIG. 7A to FIG. 7C are explanatory diagrams for illustratively showing exemplary customized prints which are formed in accordance with special printing orders made by a customer.
Figure 7B:
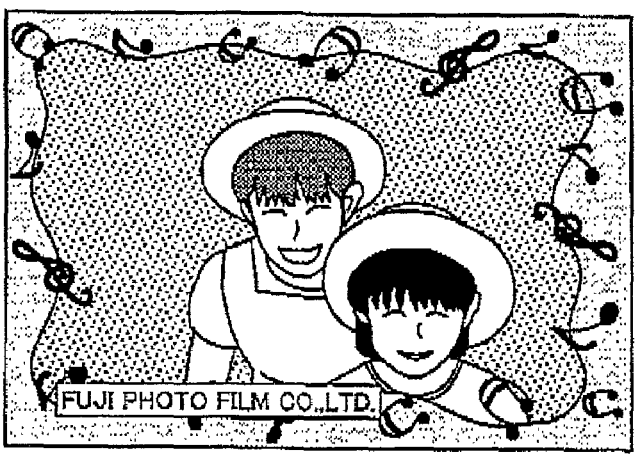
Figure 7C:
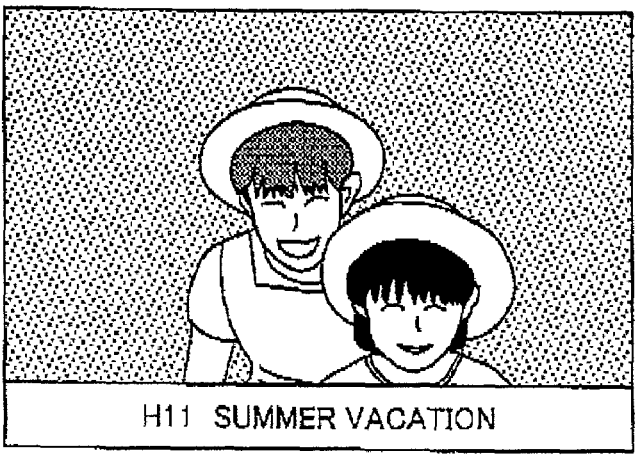

It should be noted here that the above-described item "logogram" is realized by inserting a logogram mark 76 selected by a customer in a print image shown in FIG. 7A, and the above-mentioned item "edge" is realized by decorating an edge of a print image as shown in FIG. 7B. Furthermore, an item "special finishing" may be realized by performing various types of processing, for example, a character may be inserted in a print image or an edge thereof.

Further, several sets of combinations of predetermined finishing contents such as "standard finishing", "RV (reversal)-tone finishing", "scene-image finishing" and "human-image finishing" are available to a customer who visited the DPE laboratory for the first time or a customer who does not have sufficient knowledge about image processing. In the case of set registration, when a set No. shown in FIG. 4 is entered, the set NO., the set name, and the finishing content encoded by 10 digits are registered into the customer data file of the database 40.

Further, when a customer desire a special finishing, the operator selects "individual printing" (set No. 9 in FIG. 4), and sets the respective finishing contents as to the respective items shown in FIG. 5. When accepting an order, the operator acquires the request from the customer by the conversation with the customer and enters the acquired request by using the keyboard 18a and the like. The finishing contents are set for the respective items, and the image processing conditions are registered into the customer data file of the database 40 as a code made of 10 digits in batch mode.

On the other hand, when giving an order for printing, the customer writes the name; the telephone number, the basic order content, and necessity/non-necessity of the customized printing order on a print ordering envelope 70 as shown in FIG. 6 and submits it to the DPE laboratory. It should be understood that the blanks to be filled in has the same format as that of the personal information registration slip mentioned above. It is preferable that the personal information registration slip is attached to the front side of the print ordering envelope in a duplication form so that both can be filled out at a time.

As previously mentioned, in the case of a customer who gives an order for the first time at this DPE laboratory, the customer information is registered. When the customer information has been already registered and does not have to be changed, the finishing contents having been previously registered are read out from the customer data file of the database 40 if the operator enters the name and the telephone number of the customer by manipulating the keyboard 18a.

Then, either the finishing contents which were set this time or the finishing contents which were read out from the customer data file of the database 40 are converted into a bar-code. Then, this bar-code is printed together with the customer ID on the print ordering envelope 70 by a bar-code writer (not shown) connected to the photoprinter 10.

At the same time, a check tape (label) 74 is attached to a lower portion of the print ordering envelope 70 and an end of a negative film 72, respectively A film identification number is printed on this check tape 74 for checking the print ordering envelope 70 against the negative film 72. As a result, the customer ID and the image processing conditions can be associated with the negative film.

Thus, when the customer gives an order for simultaneous printing for the first time, processing is performed based on the finishing contents set at that time. When this is not the first order for simultaneous printing, the operator enters the name and telephone number written by the customer on the print ordering envelope 70 by manipulating the keyboard 18a, whereby the finishing contents having been already registered are read out from the customer data file of the database 40 and printed on the print ordering envelope 70 by the bar-code mode so that print processing is performed in accordance with the finishing contents similar to those applied to the previous printing. Further, in the case of reprinting, when the customer ID on a print ordering envelope used in the simultaneous printing is read out with the bar-code reader, the finishing contents previously used are read out from the database 40 so that reprints similar to those in simultaneous printing can be output. If the customer desires a special finishing different from the previous finishing previously requested, the operator can accept the special finishing and change the finishing contents. Thus, prints can be produced easily based on the finishing contents adapted to the customized order from the customer.

The set value changing subsection 60 changes the values set for the image processing conditions which have been automatically set by the set-up subsection 56 based upon either the finishing contents set by the image processing condition coding subsection 58 or the finishing contents read out from the database 40. The thus changed values for the image processing conditions are sent to both the fine scan data processing section 52 and the embedding section 62. The fine scan data processing section 52 executes the image processing operations based upon the set values having been changed, and the obtained data is output as output image data.

The embedding section 62 embeds information on the image processing conditions (finishing contents) in the output image data. The method for embedding the information is not limited in any particular way, but a method in which embedding cannot be substantially confirmed on the print. To this end, it is preferable to employ a technique capable of embedding information in an image, for example, electronic watermarking technique and steganography. Alternatively, encoded information may be printed outside the frame of a print image or on a rear surface of a print. Furthermore, finishing contents may be printed on another piece of paper different from the print produced.

The output image data is supplied to the printer 16.

The printer 16 comprises a printer unit (exposing unit) for exposing a light-sensitive material (photographic paper) in accordance with the supplied image data to record a latent image and a processor (developing unit) for subjecting the exposed light-sensitive material to a specified development process thereby outputting a print.

To give one example, the light-sensitive material is cut to a specified length in accordance with the size of the final print; thereafter, three light beams for exposure to red (R), green (G) and blue (B) in accordance with the spectral sensitivity characteristics of the light-sensitive material are modulated in accordance with the image data delivered from the processing apparatus 14; the three modulated light beams are deflected in a main scanning direction and, at the same time, the light-sensitive material is transported in an auxiliary scanning direction perpendicular to the main scanning direction so as to record a latent image by two-dimensional scan exposure with the light beams; a back print is recorded and the light-sensitive material having the latent image recorded thereon is supplied to the processor, which performs a wet development process comprising color development, bleach-fixing and rinsing; the thus processed light-sensitive material is dried to produce a print; a plurality of prints thus produced are sorted and stacked on a specified unit basis such as one film roll.

As previously mentioned, the encoded information may be transferred to the photoprinter 10 by a method in which an operator enters the encoded information with the keyboard, a method which relies on electric connection, or a method in which the encoded information is transferred via an embedded medium (bar-code, memory card or the like).

Also, as previously mentioned, the customized printing system contains the database and the image processing apparatus and these apparatus are electrically connected to each other so as to function as this customized printing system. It should also be understood that the expression "electrically connected" involves both a wiring connection and a wireless connection realized by employing electromagnetic waves, sound waves, or optical signals. Further, the expression "customer information" may involve such customer information recorded on a magnetic card or an IC card owned by a customer, customer information which is managed based upon information of a card which includes bar-codes or other identification symbols, and customer information which is formed by a name, an address, and a telephone number of a customer. In addition, it is preferable to totalize the database so that the initial values thereof can be changed.

Figure 8:
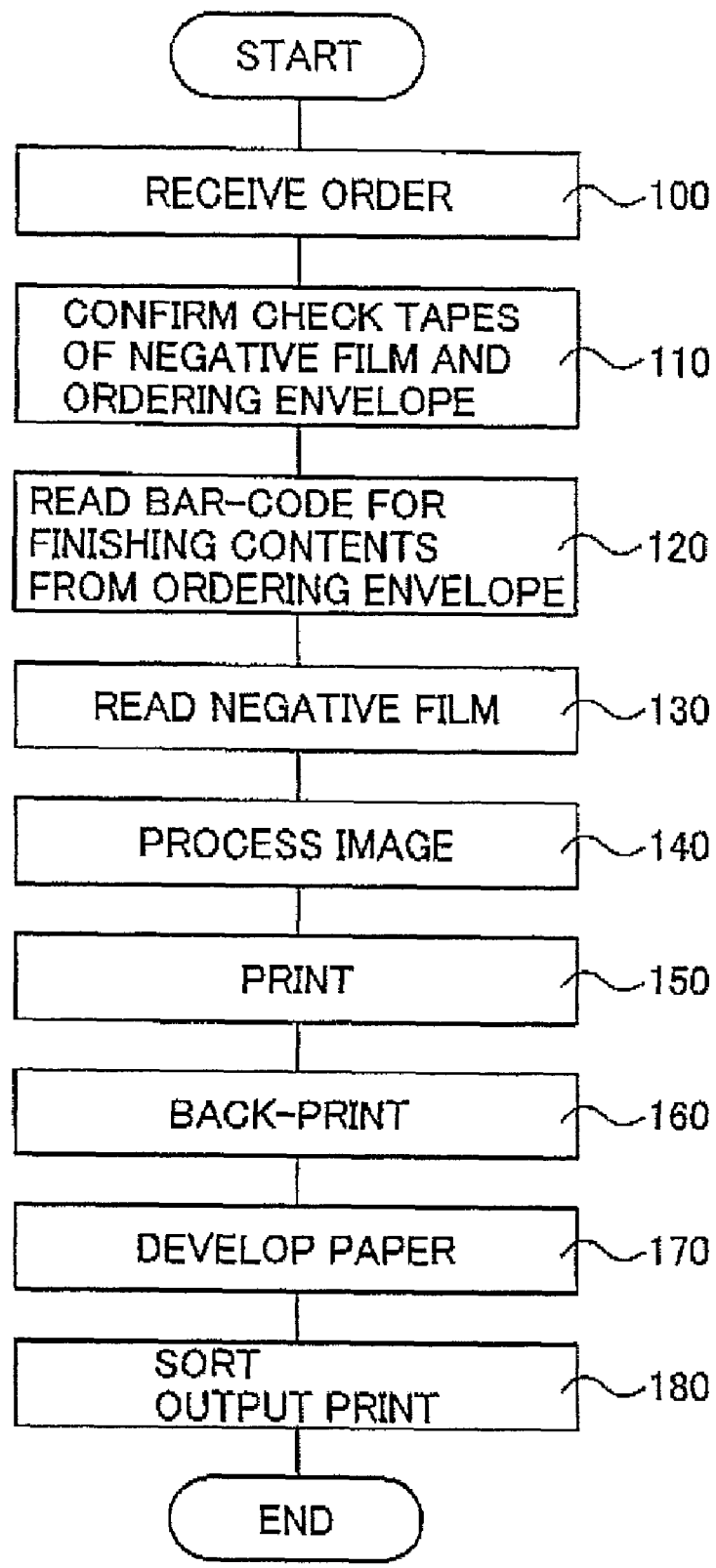
FIG. 8 is a flow chart for describing a process flow operation of the customized printing system according to this embodiment.

Next, the operation of the customized printing system according to this embodiment will now be described with reference to a flow chart of FIG. 8.

First, in an order accepting process of Step 100, when a customer brings a film on which images have been recorded, to a DPE laboratory to give an order for printing, if this is the first visit, the customer is registered, and otherwise the name or the like of the customer is entered by using the keyboard whereby the customer ID and the finishing contents (image processing condistions) having been previously registered are read out from the database and printed on a print ordering envelope in a bar-code form. Further, a check tape is attached for checking the print ordering envelope against the negative film.

Next, in Step 110, the operator confirms that the check tape attached to the upper surface of the print ordering envelope is the same as that attached to the developed negative film.

As to both the print ordering envelope and the negative film in which the numbers of the check tapes are the same, a bar-code which indicates the finishing contents on the print ordering envelope is read by using the bar-code reader in Step 120, and further, the negative film is set to the negative film carrier and read in the frame sequence with the scanner 12 in Step 130.

Next, in Step 140, the processing apparatus 14 reads out the finishing contents corresponding to the bar-coded finishing contents from the customer data file of the database 40, and then, subjects the image data read from the negative film to image processing in accordance with the finishing contents on a frame basis. For example, the image processing apparatus 14 performs image processing such as strong/weak sharpness and soft/hard gradation for each frame. Alternatively, the image processing apparatus 14 executes the following processing operations: A logogram mark is composed on an edge of a print, for instance, at a lower right position, or characters of one line are composed at a lower position of a print.

Next, in Step 150, the exposure process operation is carried out by employing a laser scanning/exposing device with respect to pre-cut sheets of color printing paper. Next, in Step 160, the finishing contents are printed as a number of 10 digits by employing, for example, a ink ribbon type printer or the like on the rear surface of the exposed color printing paper.

Thereafter, in Step 170, the exposed color printing paper is developed. In step 180, the developed color printing paper is sorted for each request and outputted as finished prints. Then, the operator inserts the finished prints for one request and the developed negative films having been cut in pieces into the print ordering envelope, and then returns the print ordering envelope to the customer.

As previously described in detail, in accordance with the customized printing system of this embodiment, the image processing conditions (namely, finishing contents) customized by the customers are registered in the database for each customer and handling operations between the customer information and the image processing conditions are carried out based upon the film identification numbers. As a consequence, the customized prints on which the requests from the customer are reflected can be formed with advantage.

It should also be understood that the above-mentioned customized printing system can function not only in one DEP laboratory, but also in a plurality of DPE laboratories having similar functions. To be more specific, databases in printing systems in the plurality of DPE laboratories are electrically connected to each other so as to constitute a network, through which image processing conditions specific to a customer stored in another database are read out based on the customer information and employed to perform image processing. In this way, a customer can receive the same service in any DPE laboratory within the network no matter which DPE laboratory receives the customer's order.

While both the image processing apparatus and the customized printing system using this image processing apparatus, according to the present invention, have been described in detail, it should be noted that the invention is by no means limited to the foregoing embodiment and various improvements and modifications may of course be made without departing from the scope and spirit of the invention.

Also, as previously described, in accordance with the present invention, even in the case of simultaneous printing in particular, image processing in accordance with the finishing contents desired by the customer can be performed based on the registered customer information in response to the customized request from the customer thereby producing a print on which the customer's desire is reflected.

What is claimed is:

1. An image processing apparatus comprising:
    an image data processing section for executing at least one image processing operation with respect to digital image data;
    a database; and
    a condition setting section; and
    wherein said condition setting section comprises:
    a set-up subsection for automatically setting initial values for image processing conditions for the at least one image processing operation based on the digital image data; and
    an image processing condition coding section which sets in response to customized requests from a customer a plurality of changed values for image processing conditions for the at least one image processing operation from among plural levels and/or plural combinations of typically preset image processing conditions for the at least one image processing operation, as well as encodes said set plurality of changed values for image processing conditions in batch mode in response to the customized requests from the customer and which allow said coded plurality of changed values for image processing conditions together with customer information to register into said database; and
    a set value changing subsection for changing the initial values for image processing conditions which have been automatically set by the set-up subsection into the set plurality of changed values for image processing conditions when said plurality of changed values for image processing conditions have been set, or into the plurality of changed values for image processing conditions which have been read out from said database in response to the customized requests from the customer when said plurality of changed values for image processing conditions have been registered into said database in response to the customized requests from the customer,
    wherein said image data processing section performs said at least one image processing operation based on the plurality of changed values for image processing conditions in response to the customized requests from the customer.

2. The image processing apparatus as claimed in claim 1, wherein:
    said at least one image processing operation includes at least one of a sharpness processing operation, a gradation processing operation, a density processing operation, a color processing operation, a shielding-print processing operation, a partial correction processing operation, a logogram/character-synthesizing process operation, and an edging process operation; and
    said image processing conditions include conditions selected from at least one group consisting of execution/no execution, strong/weak, and deep/light of one image processing operation.

3. The image processing apparatus as claimed in claim 1, further comprising:
    an embedding section for embedding said plurality of changed values for image processing conditions into output image data which has been processed based on said plurality of changed values for image processing conditions.

4. The image processing apparatus as claimed in claim 1, further comprising:
    a manipulating unit for inputting said customer information,
        wherein said plurality of changed values for image processing conditions for said at least one image processing operation are selected from among the plural levels and/or the plural combinations of typically preset image processing conditions for said at least one image processing operation in response to the customized requests from the customer by said manipulating unit, and said image processing condition coding section sets said selected plurality of changed values for image processing conditions as said plurality of changed values for image processing conditions in response to the customized requests from the customer.

5. A customized printing system comprising:

an image input apparatus for inputting thereinto an image as digital image data;

an image processing apparatus comprising:
  an image data processing section for executing at least one image processing operation with respect to digital image data;
  a database; and
  a condition setting section; and an image output apparatus for outputting the image-processed image data as output image data, wherein said condition setting section comprises:

a set-up subsection for automatically setting initial values for image processing conditions for the at least one image processing operation based on the digital image data; and an image processing condition coding section which sets in response to customized requests from a customer a plurality of changed values for image processing conditions for the at least one image processing operation from among plural levels and/or plural combinations of typically preset image processing conditions for the at least one image processing operation, as well as encodes said set plurality of changed values for image processing conditions in batch mode in response to the customized requests from the customer and which allow said coded plurality of changed values for image processing conditions together with customer information to register into said database; and a set value changing subsection for changing the initial values for image processing conditions which have been automatically set by the set-up subsection into the set plurality of changed values for image processing conditions when said plurality of changed values for image processing conditions have been set, or into the plurality of changed values for image processing conditions which have been read out from said database in response to the customized requests from the customer when said plurality of changed values for image processing conditions have been registered into said database in response to the customized requests from the customer, wherein said image data processing section performs on said digital image data said at least one image processing operation based on the plurality of changed values for image processing conditions in response to the customized requests from the customer.

6. The customized printing system as claimed in claim 5, wherein:

said at least one image processing operation includes at least one of a sharpness processing operation, a gradation processing operation, a density processing operation, a color processing operation, a shielding-print processing operation, a partial correction processing operation, a logogram/character-synthesizing process operation, and an edging process operation; and said image processing conditions include conditions selected from at least one of the group consisting of execution/no execution, strong/weak, and deep/light of one image processing operation.

7. The customized printing system as claimed in claim 5, wherein said image processing apparatus further comprises:

an embedding section for embedding said plurality of changed values for image processing conditions into said output image data which has been processed based on said plurality of changed values for image processing conditions.

8. The customized printing system as claimed in claim 5, wherein said image processing apparatus further comprises:

a manipulating unit for inputting said customer information, wherein said plurality of changed values for image processing conditions for said at least one image processing operation are selected from among the plural levels and/or the plural combinations of typically preset image processing conditions for said at least one image processing operation in response to the customized requests from the customer by said manipulating unit, and said image processing condition coding section sets said selected plurality of changed values for image processing conditions as said plurality of changed values for image processing conditions in response to the customized requests from the customer.

9. The customized printing system as claimed in claim 5, wherein said database registers thereinto both a film identification number and image processing conditions with respect to an image photographed on a photographic film corresponding to said film identification number.

10. The customized printing system as claimed in claim 9, wherein said database is to further register information related to a customer in connection with the image processing conditions as to a printing order of said customer.

11. The customized printing system as claimed in claim 10, wherein said database is connected to a plurality of other databases via a communication network, whereby the image processing conditions related to said customer, which is saved in said other databases, can be utilized based on the information related to said customer.

12. An image processing apparatus for performing at least one image processing operation with respect to digital image data, said image processing apparatus comprising:

a data processing section;
a Log converter;
a prescan memory;
a fine scan memory, wherein the data processing section and the Log converter are operatively connected to the prescan memory and the fine scan memory;
a prescan data processing section, wherein the prescan data processing section is operatively connected to the prescan memory;
a database;
a condition setting section, wherein said condition setting section comprises:
  a set-up subsection for automatically setting initial values for image processing conditions for the at least one image processing operation based on the digital image data; and
  an image processing condition coding subsection which sets in response to customized requests from a customer a plurality of new image processing conditions for the at least one image processing operation from among plural levels and/or plural combinations of typically preset image processing conditions for the at least one image processing operation, as well as encodes said set plurality of new image processing conditions in batch mode in response to the customized requests from the customer and which allow said coded plurality of new image processing conditions together with customer information to register into said database; and a set value changing subsection for changing the initial values for image processing conditions which have been automatically set by the set-up subsection into changed values for the set plurality of new image processing conditions when said changed values have been set, or into the changed values which have been read out from said database in response to the customized requests from the customer when said changed values have been registered into said database in response to the customized requests from the customer; and a fine scan data processing section, wherein the changed values from the set value changing subsection are sent to the fine scan data processing section for executing the at least one image processing operation based on said changed values in response to the customized requests from the customer.

13. A customized printing system comprising:

an image input apparatus for outputting digital image data; and an image processing apparatus for performing at least one image processing operation with respect to the digital image data, said image processing apparatus further comprising:

a data processing section;
a log converter;
a prescan memory;
a fine scan memory, wherein the data processing section and the Log converter are operatively connected to the prescan memory and the fine scan memory;
a prescan data processing section, wherein the prescan data processing section is operatively connected to the prescan memory;
a database;
a condition setting section, wherein said condition setting section comprises:
a set-up subsection for automatically setting initial values for image processing conditions for the at least one image processing operation based on the digital image data; and
an image processing condition coding subsection which sets in response to customized requests from a customer a plurality of new image processing conditions for the at least one image processing operation from among plural levels and/or plural combinations of typically preset image processing conditions for the at least one image processing operation, as well as encodes said set plurality of new image processing conditions in batch mode in response to the customized requests from the customer and which allow said coded plurality of new image processing conditions together with customer information to register into said database; and a set value changing subsection for changing the initial values for image processing conditions which have been automatically set by the set-up subsection into changed values for the set plurality of new image processing conditions when said changed values have been set, or into the changed values which have been read out from said database in response to the customized requests from the customer when said changed values have been registered into said database in response to the customized requests from the customer;

a fine scan data processing section, wherein the changed values from the set value changing subsection are sent to the fine scan data processing section for executing the at least one image processing operation based on said changed values in response to the customized requests from the customer; and an image output apparatus for outputting image-processed image data output from the fine scan data processing section as output image data.

14. A method for creating a photoprint with a digital photoprinter, which comprises:

inputting an image to an image input apparatus;

outputting digital image data corresponding to the image from the image input apparatus to an image processing apparatus;

performing at least one image processing operation with respect to the digital image data with the image processing apparatus, wherein the performing of the at least one image processing operation apparatus further comprises, automatically setting initial values for image processing conditions for the at least one image processing operation based on the digital image data with a set-up subsection of the image processing apparatus, setting in response to customized requests from a customer a plurality of new image processing conditions for the at least one image processing operation from among plural levels and/or plural combinations of typically preset image processing conditions for the at least one image processing operation, as well as encoding said set plurality of new image processing conditions in batch mode in response to the customized requests from the customer, and allowing said coded plurality of new image processing conditions together with customer information to register into said database; and changing the initial values for image processing conditions which have been automatically set by the set-up subsection into changed values for the set plurality of new image processing conditions with a set value changing subsection of the image processing apparatus when said changed values have been set, or into the changed values which have been read out from said database in response to the customized requests from the customer with the set value changing subsection when said changed values have been registered into said database in response to the customized requests from the customer.

15. The method according to claim 14, further comprising sending the changed values from the set value changing subsection to a fine scan data processing section for executing the at least one image processing operation based on said changed values in response to the customized requests from the customer.

16. The method according to claim 15, further comprising outputting image data output from the fine scan data processing section to an image output apparatus.

* * * * *